US008498098B2

(12) United States Patent
Dupre

(10) Patent No.: US 8,498,098 B2
(45) Date of Patent: Jul. 30, 2013

(54) SYSTEM FOR REMOVABLY RETAINING A VOLTAGE CONVERTING DEVICE

(75) Inventor: Scott R. Dupre, Fall River, MA (US)

(73) Assignee: Koninklijke Philips N.V., Eindhoven (NL)

( * ) Notice: Subject to any disclaimer, the term of this patent is extended or adjusted under 35 U.S.C. 154(b) by 399 days.

(21) Appl. No.: 12/976,441

(22) Filed: Dec. 22, 2010

(65) Prior Publication Data

US 2012/0162865 A1 Jun. 28, 2012

(51) Int. Cl.
*G06F 1/16* (2006.01)

(52) U.S. Cl.
USPC ........................................ 361/679.01; 174/50

(58) Field of Classification Search
USPC ........................................ 361/679.01; 174/50
See application file for complete search history.

(56) References Cited

U.S. PATENT DOCUMENTS

| | | | | |
|---|---|---|---|---|
| 5,031,082 | A | 7/1991 | Bierend | |
| 5,038,261 | A | 8/1991 | Kloos | |
| 5,055,746 | A | 10/1991 | Hu | |
| 5,072,216 | A | 12/1991 | Grange | |
| 5,176,442 | A | 1/1993 | Richardson | |
| 5,192,126 | A | 3/1993 | Remeyer | |
| 5,209,560 | A | 5/1993 | Taylor | |
| 5,329,431 | A | 7/1994 | Taylor | |
| 5,336,097 | A | 8/1994 | Williamson | |
| 5,347,431 | A | 9/1994 | Blackwell | |
| 5,382,947 | A | 1/1995 | Thaler | |
| 5,406,176 | A | 4/1995 | Sugden | |
| 5,502,627 | A | 3/1996 | Hunt | |
| 5,506,715 | A | 4/1996 | Zhu | |
| 5,526,245 | A | 6/1996 | Davis | |
| 5,554,979 | A | 9/1996 | Kohar | |
| 5,593,244 | A | 1/1997 | Ruckert | |
| 5,637,964 | A | 6/1997 | Hakkarainen | |
| 5,731,667 | A | 3/1998 | Luchetta | |
| 5,769,531 | A | 6/1998 | Hunt | |
| 5,803,755 | A | 9/1998 | Kuchar | |
| 5,855,485 | A | 1/1999 | Patti | |
| 5,921,659 | A | 7/1999 | Hunt | |
| 5,938,362 | A | 8/1999 | Bastiansen | |
| 5,988,838 | A | 11/1999 | Rudenberg | |
| 5,989,067 | A | 11/1999 | Morgan | |
| 6,004,005 | A | 12/1999 | Demshki | |
| 6,032,432 | A | 3/2000 | Patti | |
| 6,079,992 | A | 6/2000 | Kuchar | |
| 6,130,412 | A | 10/2000 | Sizemore | |
| 6,163,275 | A | 12/2000 | Hartzell | |
| 6,169,377 | B1 | 1/2001 | Bryde | |
| 6,174,073 | B1 | 1/2001 | Regan | |
| 6,220,721 | B1 | 4/2001 | Chan | |
| 6,273,587 | B1 | 8/2001 | Demshki | |
| 6,607,307 | B2 * | 8/2003 | Gilliland et al. | 385/88 |
| 6,655,817 | B2 | 12/2003 | Devlin | |
| 6,667,578 | B2 | 12/2003 | Lansing | |
| 7,018,072 | B2 | 3/2006 | Mier-Langner | |
| 7,027,736 | B1 | 4/2006 | Mier-Langner | |

(Continued)

FOREIGN PATENT DOCUMENTS

| | | |
|---|---|---|
| JP | 3161466 | 10/2010 |
| KR | 2010088254 A | 10/2010 |

*Primary Examiner* — Lisa Lea Edmonds

(57) ABSTRACT

Disclosed herein is a voltage converting system (10). The voltage converting system includes a housing (20) having a receptacle therein. The receptacle may removably receive a voltage converting device (50) such as a transformer, a power supply, or a driver.

16 Claims, 4 Drawing Sheets

U.S. PATENT DOCUMENTS

| | | | | |
|---|---|---|---|---|
| 7,111,957 | B2 | 9/2006 | Bernhart | |
| 7,397,384 | B1 | 7/2008 | MacKenzie | |
| 7,952,022 | B2 * | 5/2011 | Rippel et al. | 174/50 |
| 2010/0117552 | A1 | 5/2010 | Lee | |
| 2010/0176744 | A1 | 7/2010 | Lee | |
| 2010/0201269 | A1 | 8/2010 | Tzou | |
| 2010/0202111 | A1 | 8/2010 | Liang | |
| 2010/0275991 | A1 * | 11/2010 | Chan | 136/256 |

* cited by examiner

SYSTEM FOR REMOVABLY RETAINING A VOLTAGE CONVERTING DEVICE

TECHNICAL FIELD

The present invention is directed generally to a voltage converting system. More particularly, various inventive methods and apparatus disclosed herein relate to a housing for removably receiving a voltage converting device and optionally include a voltage converting device removably receivable in the housing.

BACKGROUND

Voltage converting devices include devices such as transformers, LED drivers, and power supplies that receive electrical input having a first characteristic and convert the electrical input into electrical output having a second characteristic distinct from the first characteristic in one or more aspects. For example, voltage converting devices may change voltage from AC to DC, may change the frequency of the voltage, and/or may change the amplitude of the voltage.

Voltage converting devices are often implemented into lighting fixtures. Typically, such voltage converting devices are wired into mating leads of a lighting fixture with wire nuts and secured to the lighting fixture utilizing clamps, a hinged mechanism, or other means. Such implementations may present one or more drawbacks. For example, such implementations utilized in recessed lighting fixtures may prevent convenient access to the voltage converting device from the room side of the fixtures for replacement, repair, etc. Also, for example, such implementations may require cutting and/or disconnecting the mating leads and/or the leads extending from the voltage converting device in order to repair or replace the voltage converting device and may require the subsequent reconnection of leads.

Thus, there is a need in the art for a voltage converting system that enables convenient access to the voltage converting device and/or that eliminates the necessity of manipulating wires extending to or from the voltage converting device when installing and/or removing the voltage converting device.

SUMMARY

The present disclosure is directed to inventive methods and apparatus for a voltage converting system, and, more specifically, for a housing for removably receiving a voltage converting device and optionally for a voltage converting device removably receivable in the housing. For example, the housing may include a receptacle having a pair of high voltage housing contacts and a pair of low voltage housing contacts therein. The voltage converting device may be removably received in the receptacle of the housing such that a pair of high voltage converter contacts of the device are electrically coupled with the high voltage housing contacts and a pair of low voltage converter contacts of the device are electrically coupled with the low voltage housing contacts. Positioning structure may be provided on the housing and on the voltage converting device to only allow the voltage converting device to be inserted in a given orientation range in the receptacle of the housing.

Generally, in one aspect, an apparatus for removably receiving a voltage converting device is provided and includes a housing having a recessed receptacle. The recessed receptacle includes a rear wall and sidewall structure extending upwardly from the rear wall and generally defining a receptacle opening. A first high voltage contact, a second high voltage contact, a first low voltage contact, and a second low voltage contact are all within the receptacle. A first high voltage lead is fixedly electrically coupled to the first high voltage contact and extends from the housing, a second high voltage lead is fixedly electrically coupled to the second high voltage contact and extends from the housing, a first low voltage lead is fixedly electrically coupled to the first low voltage contact and extends from the housing, and a second low voltage lead is fixedly electrically coupled to the second low voltage contact and extends from the housing. At least one positioning structure is within the receptacle. The at least one positioning structure only enables receipt of the voltage converting device within the receptacle in a predefined orientation range. The positioning structure prevents contact between contacts of the voltage converting device and any of the first high voltage contact, the second high voltage contact, the first low voltage contact, and the second low voltage contact unless the voltage converting device is in the orientation range. The apparatus enables removable receipt of the voltage converting device.

In some embodiments at least one positioning structure includes a first positioning protrusion extending outwardly from at least one of the rear wall and the sidewall. In some versions of those embodiments the at least one positioning structure includes a second positioning protrusion extending outwardly from at least one of the rear wall and the sidewall.

In some embodiments the receptacle opening is continuously open and obstruction free when the voltage converting device is received in the receptacle.

In some embodiments the sidewall includes at least one recess area therein, the recess area having a recessed edge that is closer to the rear wall than an immediately adjacent edge of the sidewall.

Generally, in another aspect, a voltage converting system for use in a luminaire is provided and includes a voltage converting device removably receivable in a recessed receptacle of a housing. The voltage converting device has a first converter high voltage contact, a second converter high voltage contact, a first converter low voltage contact, a second converter low voltage contact, and at least one converter positioning structure. The housing has a recessed receptacle. The recessed receptacle includes a rear wall and sidewall structure extending upwardly from the rear wall and generally defining a receptacle opening. The housing includes a first housing high voltage contact, a second housing high voltage contact, a first housing low voltage contact, and a second housing low voltage contact all within the receptacle. The housing further includes at least one housing positioning structure within the receptacle. The at least one housing positioning structure interfaces with the at least one converter positioning structure only when the voltage converting device is in a predefined orientation range with respect to the receptacle. The positioning structure enables contact between the first converter high voltage contact, the second converter high voltage contact, the first converter low voltage contact, and the second converter low voltage contact and respective of the first housing high voltage contact, the second housing high voltage contact, the first housing low voltage contact, and the second housing low voltage contact only when the voltage converting device is in the predefined orientation range.

In some embodiments the at least one housing positioning structure includes a first positioning protrusion extending outwardly from at least one of the rear wall and the sidewall. In some versions of those embodiments the at least one converter positioning structure includes a first positioning recess. In some versions of those embodiments the at least one housing positioning structure includes a second positioning protrusion extending outwardly from at least one of the rear wall and the sidewall. In some versions of those embodiments at least two of the at least one housing positioning structure are provided and at least two of the at least one converter positioning structure are provided.

In some embodiments the voltage converting device is in interference fit with the housing when removably received therein. In some versions of those embodiments the first converter high voltage contact, the second converter high voltage contact, the first converter low voltage contact, and the second converter low voltage contact are in interference fit with respective of the first housing high voltage contact, the second housing high voltage contact, the first housing low voltage contact, and the second housing low voltage contact when the voltage converting device is removably received in the receptacle. In some versions of those embodiments the voltage converting device is maintained in the receptacle through interference fit alone.

In some embodiments the sidewall includes at least one recess area therein, the recess area providing access to a side of the voltage converting device when the voltage converting device is removably received in the receptacle.

In some embodiments the voltage converting device is an LED driver.

In some embodiments the receptacle opening is continuously open and obstruction free when the voltage converting device is received in the receptacle.

The term "light source" should be understood to refer to any one or more of a variety of radiation sources, including, but not limited to, LED-based sources, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Lighting fixtures often implement one or more voltage converting devices into a light fixture such as transformers, LED drivers, and/or power supplies. Such voltage converting devices are often wired into mating leads of the lighting fixture with wire nuts and secured to the lighting fixture utilizing clamps, a hinged mechanism, or other means. Such implementations may prevent convenient access to the voltage converting device and/or may require cutting and/or disconnection of leads extending from the voltage converting device in order to repair or replace the voltage converting device. Thus, Applicants have recognized and appreciated that it would be beneficial to provide a voltage converting system that enables convenient access to the voltage converting device and/or that eliminates the necessity of manipulating leads extending to or from the voltage converting device when installing or removing the voltage converting device.

More generally, Applicants have recognized and appreciated that it would be beneficial to have a voltage converting system that includes a housing for removably receiving a voltage converting device and/or to a voltage converting device removably receivable in such a housing.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, various embodiments of the apparatuses and methods disclosed herein are particularly suited for use in combination with a recessed lighting fixture.

Accordingly, for illustrative purposes, the claimed invention may discussed herein in conjunction with such a lighting fixture. However, other configurations, applications, and implementations are contemplated without deviating from the scope or spirit of the claimed invention.

Figure 1:
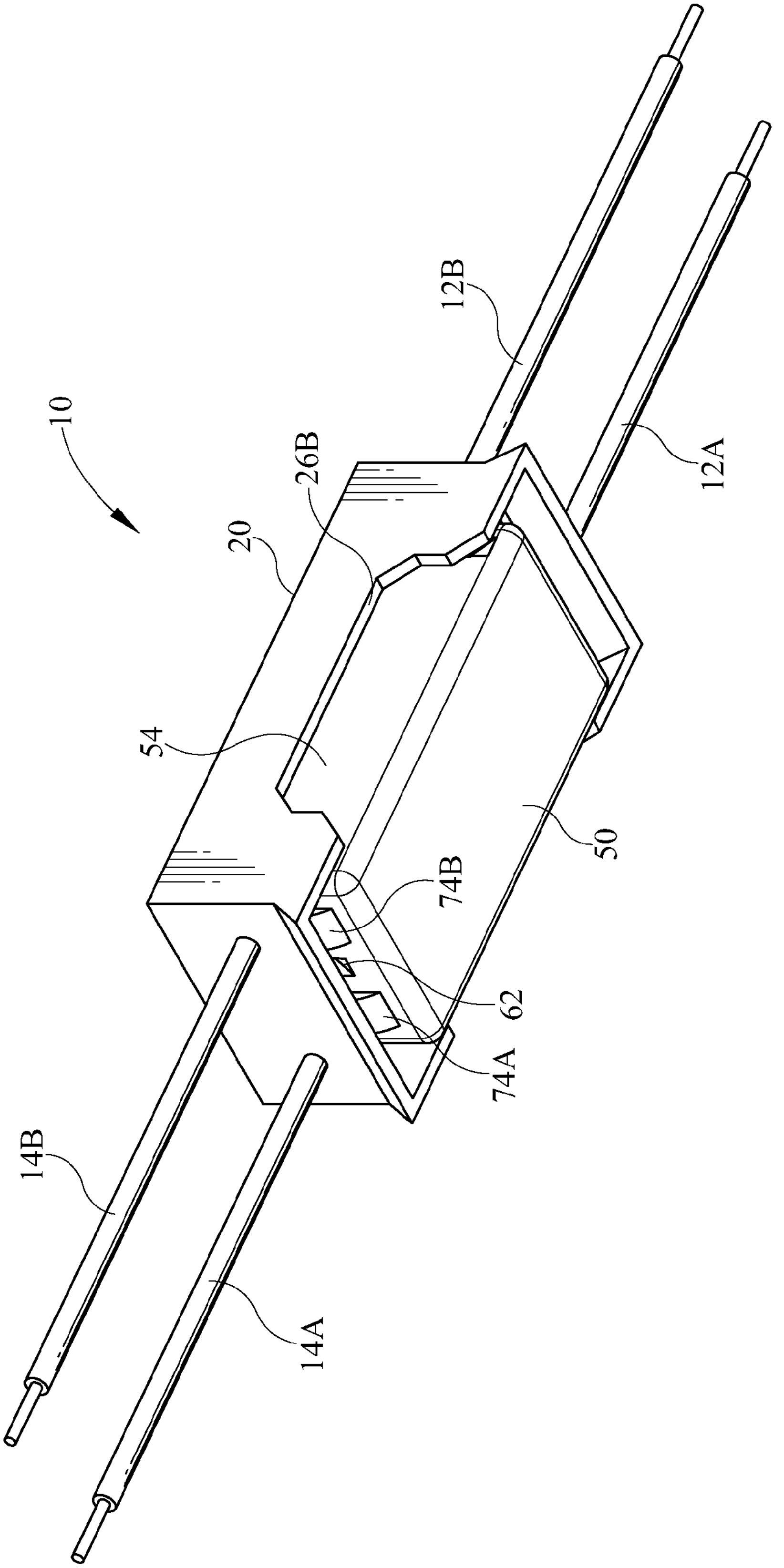
FIG. 1 illustrates an embodiment of a voltage converting system; a voltage converting device of the system is shown partially received in a receptacle of a housing of the system.

Referring to FIG. 1, in one embodiment, a voltage converting system 10 includes a voltage converting device 50 that is removably receivable in a receptacle of a housing 20. The voltage converting device 50 is shown partially received in the receptacle of the housing in FIG. 1 to provide a better view of certain aspects of the voltage converting device 50. As described in additional detail herein, when the voltage converting device 50 is fully received in the receptacle of the housing 20, a plurality of electrical contacts of the voltage converting device 50 will be electrically coupled with corresponding electrical contacts of the housing 20, and with corresponding wires extending from the housing 20.

Figure 2:
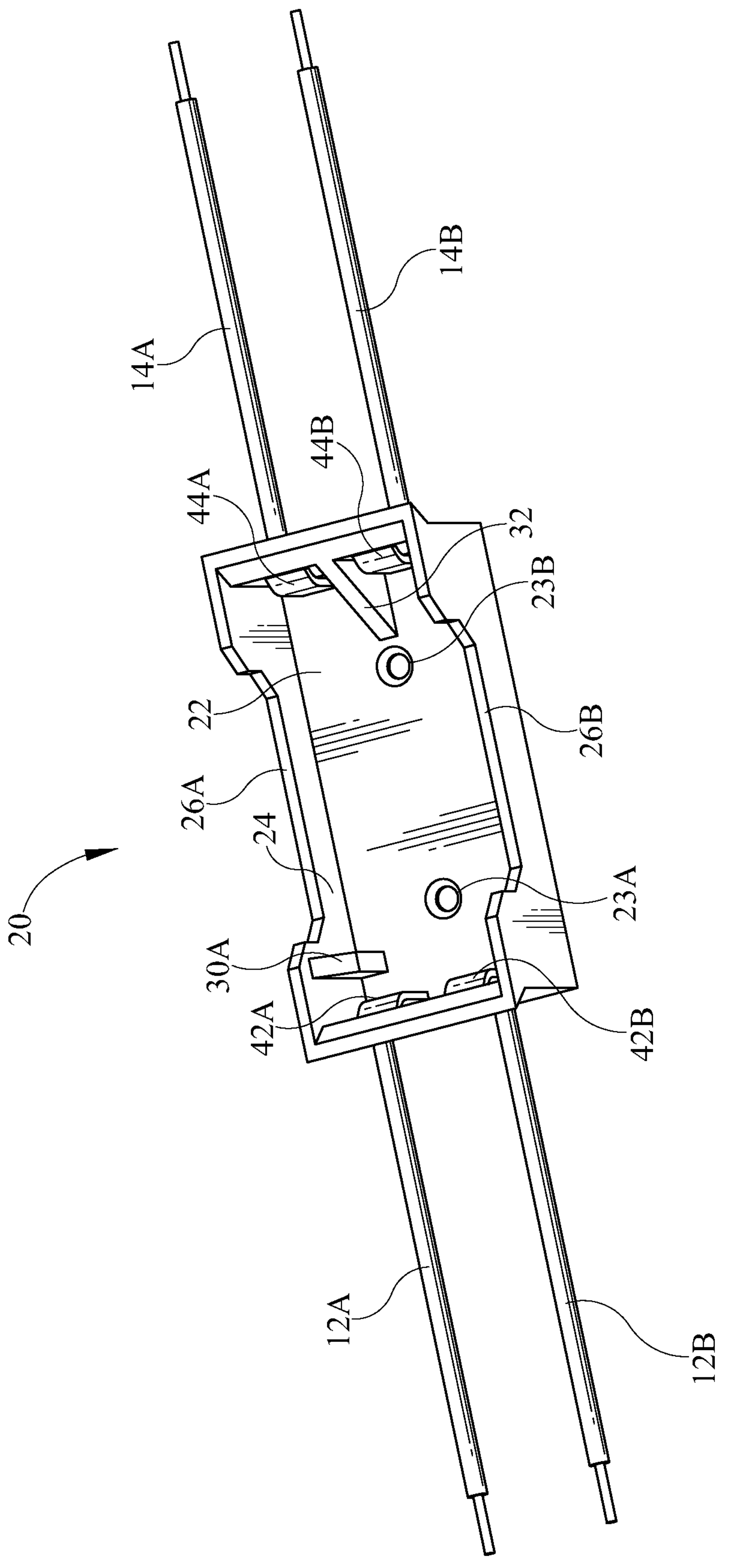
FIG. 2 illustrates the housing of the voltage converting system of FIG. 1; the voltage converting device of FIG. 1 is not shown.

Referring now to FIG. 2, the housing 20 of the voltage converting system 10 is illustrated. The voltage converting device 50 is not shown in FIG. 2. The housing 20 includes a recessed receptacle that is generally defined by a rear wall 22 and sidewall structure 24 extending upwardly from the rear wall 22. The depicted housing 20 and receptacle are generally rectangular in shape. Although a generally rectangular housing 20 and receptacle are depicted in the illustrated embodiment, one of ordinary skill in the art, having had the benefit of the present disclosure, will recognize and appreciate that the housing 20 and/or receptacle may take on alternative shapes and dimensions. For example, in alternative embodiments the rear wall 22 may be non-planar, the sidewalls 24 may be non-planar, and/or the housing 20 may have an overall shape that is distinct from the overall shape of the receptacle.

The rear wall 22 includes a pair of fastener openings 23A, 23B therethrough. The fastener openings 23A, 23B may receive a fastener therethrough to secure the housing 20 to other structure of a lighting fixture. In alternative embodiments additional or alternative structure may be utilized to secure the housing 20 within a lighting fixture. A first side recess 26A is provided in a first longitudinally extending side of sidewall 24 and a second side recess 26B is provided in a second longitudinally extending side of sidewall 24. The recesses 26A, 26B may enable access to peripheral portions of the voltage converting device 50 when it is received in the receptacle to allow a user to more easily remove the voltage converting device 50 from the receptacle. For example, the recesses 26A, 26B may enable a user to utilize a thumb and finger from a single hand to grip and remove the voltage converting device 50 from the receptacle.

Extending outwardly from the rear wall 22 and the sidewall 24 are positioning protrusions 30A and 32. Positioning protrusion 30A is provided adjacent the first longitudinally extending side of sidewall 24. A positioning protrusion is also provided opposite the positioning protrusion 30A adjacent the second longitudinally extending side of sidewall 24, but is not visible in FIG. 2. Positioning protrusion 32 is provided adjacent an end of sidewall 24. As described in additional detail herein, positioning protrusions 30A and 32 interface with corresponding positioning structure of voltage converting device 50 to position the voltage converting device 50 and to ensure that the voltage converting device 50 is only insertable into the receptacle at one or more predefined orientations.

Flanking positioning protrusion 32 are first housing low voltage contact 44A and second housing low voltage contact 44B. The first housing low voltage contact 44A is electrically coupled to a first low voltage wire 14A extending from the housing 20. Similarly, the second housing low voltage contact 44B is electrically coupled to a second low voltage wire 14B extending from the housing 20. Opposite the first and second low voltage contacts 44A and 44B are first and second high voltage contacts 42A and 42B. The first high voltage contact 42A is electrically coupled to a first high voltage wire 12A extending from the housing 20 and the second high voltage contact 42B is electrically coupled to a second high voltage wire 12B extending from the housing 20. The depicted wires 12A, 12B, 14A, and 14B are fixedly secured to the housing 20 in contact with respective of the contacts 42A, 42B, 44A, and 44B of the housing. The wires 12A, 12B, 14A, and 14B may be fixedly secured to the housing 20 via, for example, an adhesive, coupling of the housing 20 and the wire sheathing through heating, coupling of the metal portions of the wires 12A, 12B, 14A, and 14B and respective of the contacts 42A, 42B, 44A, and 44B of the housing 20, and/or mechanical attachment. In some embodiments the wires 12A, 12B, 14A, and 14B may be fixedly secured to the housing 20 via a quick connect poke-in type connector.

Although wires 12A, 12B, 14A, and 14B are depicted in the embodiment illustrated herein, one of ordinary skill in the art, having had the benefit of the present disclosure, will recognize that other electrical leads besides wires 12A, 12B, 14A, and 14B may be utilized to place housing contacts 42A, 42B, 44A, and/or 44B in electrical contact with a voltage source and/or with other aspects of a lighting fixture such as, for example, a light source of a lighting fixture.

The contacts 42A, 42B, 44A, and 44B of the housing 20 may be manufactured from any suitably conductive material. In some embodiments one or more of the contacts 42A, 42B, 44A, and 44B may be selectively or continuously provided with non-conductive material at least partially surrounding it for safety of other reasons. For example, in some embodiments one or more of the contacts 42A, 42B, 44A, and 44B may be recessed within a non-conductive material and accessible only through an opening of sufficiently small size to prevent a user's fingers from contacting the opening. Also, for example, a spring biased non-conductive cover may additionally or alternatively be provided adjacent one or more of the contacts 42A, 42B, 44A, and 44B. The cover may be biased to cover a respective at least one of the contacts 42A, 42B, 44A, and 44B when the voltage converting device 50 is removed from the receptacle. The cover may retract away from a respective at least one of the contacts 42A, 42B, 44A, and 44B when the voltage converting device 50 is inserted into the receptacle by virtue of contact with the voltage converting device. The voltage converting device 50 may be modified to interface with any such modifications.

In some embodiments one or more of the contacts 42A, 42B, 44A, and 44B may be electrically disconnected from respective of wires 12A, 12B, 14A, and 14B when the voltage converting device 50 is removed from the receptacle of the housing 20. For example, in some embodiments when the voltage converting device 50 is removed one or more of the contacts 42A, 42B, 44A, and 44B may mechanically move away from and out of electrical contact with respective of wires 12A, 12B, 14A, and 14B or other intermediary conductive structure. Also, for example, in some embodiments contacts of the voltage converting device 50 may be positioned so as to complete an electrical connection between one or more of the contacts 42A, 42B, 44A, and 44B and respective of wires 12A, 12B, 14A, and 14B when the voltage converting device 50 is received in the receptacle of the housing 20.

Figure 3:
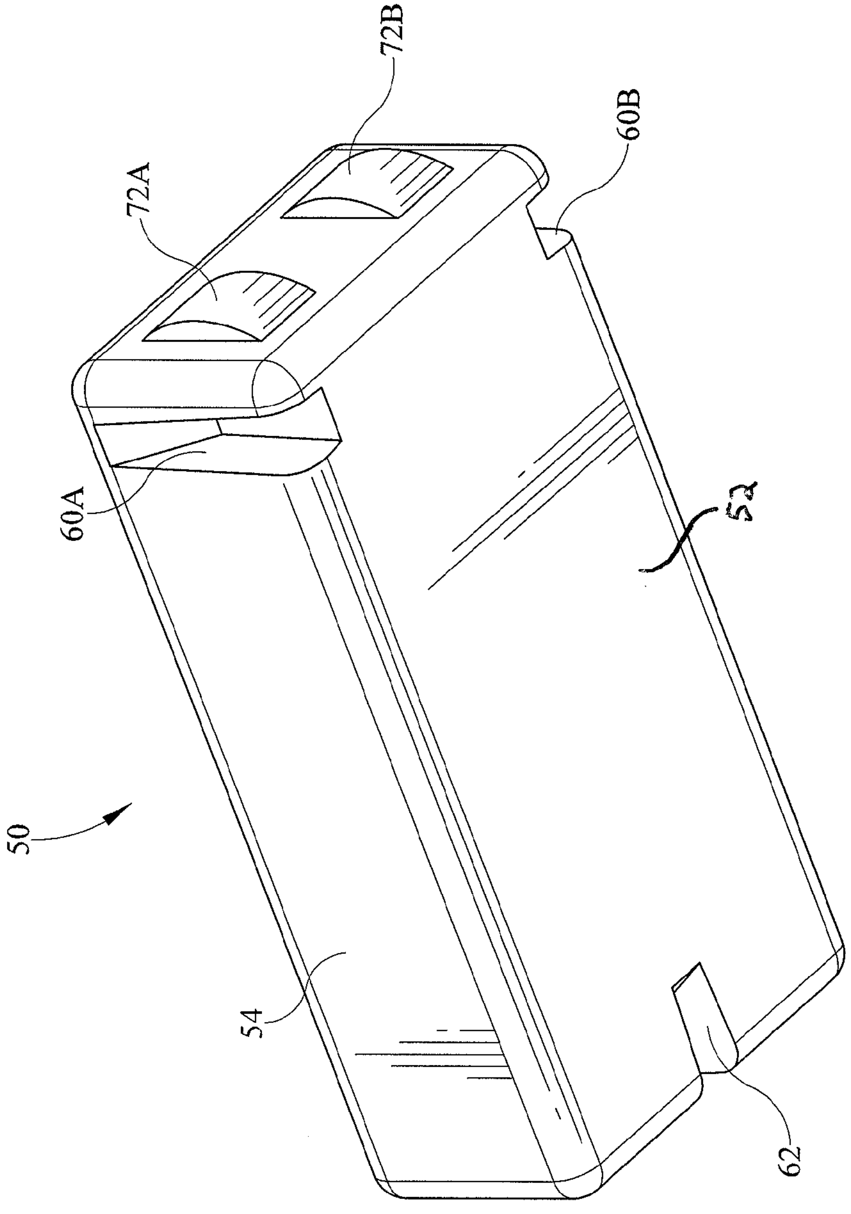
FIG. 3 illustrates the voltage converting device of the voltage converting system of FIG. 1; the housing of FIG. 1 is not shown.
Figure 4:
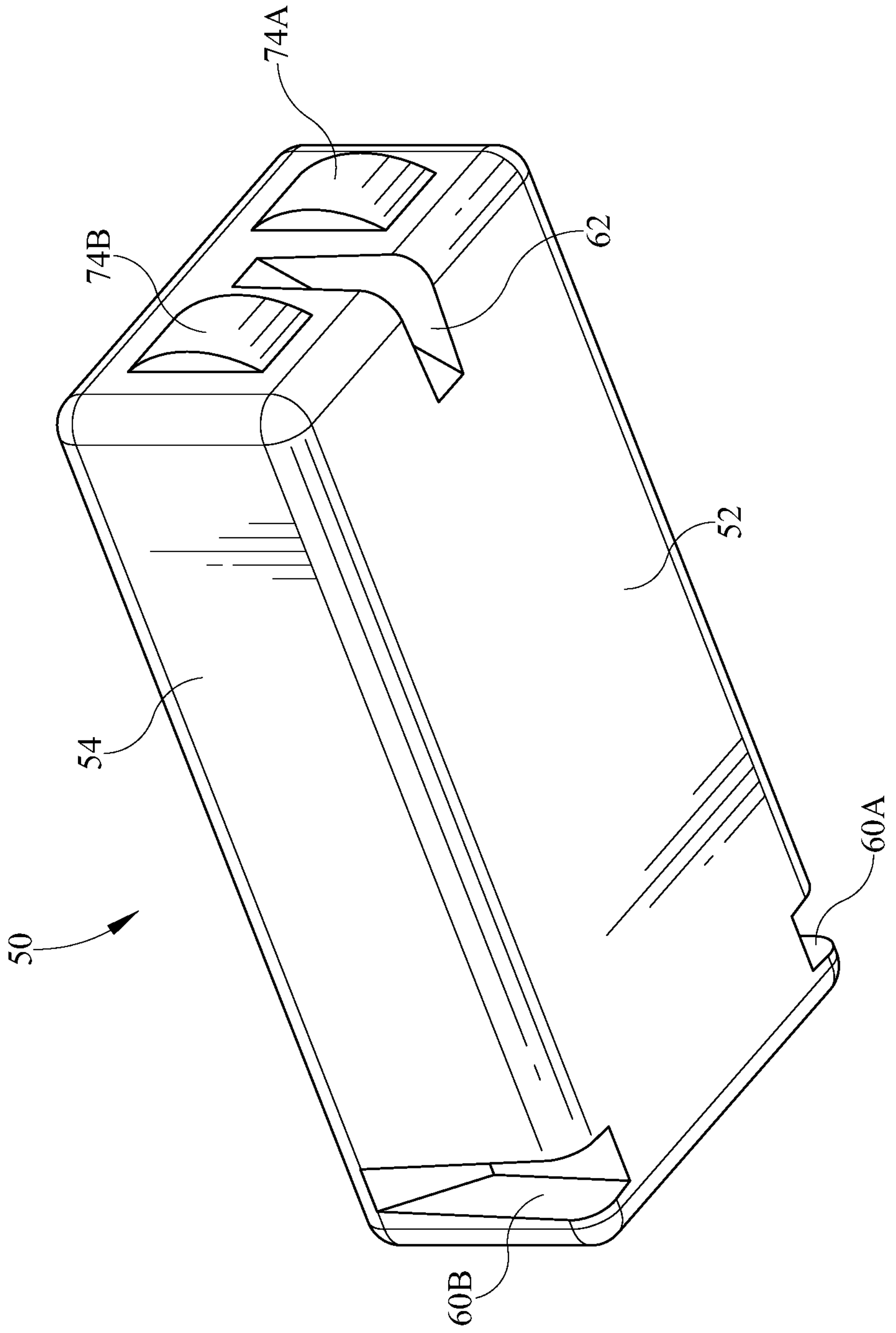
FIG. 4 illustrates an additional view of the voltage converting device of the voltage converting system of FIG. 1; the housing of FIG. 1 is not shown.

Referring now to FIG. 3 and FIG. 4, the embodiment of the voltage converting device 50 is illustrated in additional detail. The voltage converting device 50 includes a housing having a rear face 52 and side structure 54. The depicted voltage converting device 50 is generally rectangular in shape. Although a generally rectangular voltage converting device 50 is depicted in the illustrated embodiment, one of ordinary skill in the art, having had the benefit of the present disclosure, will recognize and appreciate that the voltage converting device 50 may take on alternative shapes and dimensions. For example, in alternative embodiments the rear face 52 may be non-planar and/or the side structure 54 may be non-planar. Optionally, the voltage converting device 50 may have an overall shape that is substantially similar to the overall shape of the receptacle.

The voltage converting device 50 includes first converter high voltage contact 72A and second converter high voltage contact 72B at a first end thereof. The voltage converting device 50 also includes first low voltage contact 74A and second housing low voltage contact 74B at a second end thereof. Interiorly of the voltage converting device 50 and electrically interposed between the high voltage contacts 72A and 72B and the low voltage contacts 74A and 74B are voltage converting electronics. In some embodiments the voltage converting electronics may include a transformer. In alternative embodiments the voltage converting electronics may include a driver such as a LED driver or a HID driver. In some embodiments the voltage converting electronics receive an input voltage via contacts 72A and 72B and output a voltage via contacts 74A and 74B that is different in amplitude, frequency, or otherwise from the received voltage. Also, in some embodiments the voltage converting electronics receive an input voltage via contacts 74A and 74B and output a voltage via contacts 72A and 72B that is different in amplitude, frequency, or otherwise from the received voltage.

Extending into the rear face 52 and the side structure 54 are positioning recesses 60A, 60B, and 62. Positioning recesses 60A and 60B are provided substantially opposite from one another in a longitudinally extending section of side structure 54. Positioning recess 62 is provided in an end of side structure 54. Positioning recesses 60A, 60B, and 62 interface with respective of positioning protrusion 30A, the undepicted protrusion (opposite of protrusion 30A), and positioning protrusion 32 of housing 20 to position the voltage converting device 50 and to ensure that the voltage converting device 50 is only insertable into the receptacle at one or more predefined orientations. The interaction between the positioning structure of voltage converting device 50 and the positioning structure of housing 20 ensures that voltage converting device 50 may only be electrically inserted into the receptacle of the housing 20 such that converter contacts 72A, 72B, 74A, and 74B are in electrical contact with respective of housing contacts 42A, 42B, 44A, and 44B.

One of ordinary skill in the art, having the benefit of the present disclosure will recognize that alternative positioning structure may be utilized. For example, in some embodiments one or more protrusions may be provided on the voltage converting device 50 that may interact with one or more recesses in the housing 20. Also, for example, in some embodiments more or less than three positioning structures may be provided on each of housing 20 and voltage converting device 50. For example, in some embodiments, each of housing 20 and voltage converting device 50 may only have a single positioning structure.

When the voltage converting device 50 is received in the receptacle, the converter contacts 72A, 72B, 74A, and 74B may be in interference fit with respective of housing contacts 42A, 42B, 44A, and 44B. In some embodiments the converter contacts 72A, 72B, 74A, and 74B and/or the housing contacts 42A, 42B, 44A, and 44B may be spring biased by virtue of an actual spring or by virtue of the configuration of the contact. For example, the converter contacts 72A, 72B, 74A, and 74B are spring biased by virtue of their semi cylindrical shape that enables the contacts 72A, 72B, 74A, and 74B to be depressed somewhat inwardly when contacting housing contacts 42A, 42B, 44A, and 44B, but to also exert a biased outward interference force on housing contacts 42A, 42B, 44A, and 44B. In some embodiments side structure 54 and/or recesses 60A, 60B, 62 of the voltage converting device 50 may additionally or alternatively be in interference fit with respective of the sidewall 24 and protrusions of the housing 20 when the voltage converting device 50 is received in the receptacle of the housing 20. In some embodiments interference fit between the voltage converting device 50 and the housing 20 may alone retain the voltage converting device 50 in the receptacle. In other embodiments additional structure may additionally or alternatively be utilized to retain the voltage converting device 50 in the receptacle.

In certain implementations of the voltage converting system 10 described herein, a user may install and remove a voltage converting device 50 without the use of tools. Moreover, in certain implementations a user may remove and replace a voltage converting device 50 by pulling on the voltage converting device and without the manipulation of screws or clamps. In certain implementations the keyed removable interface between the voltage converting device 50 and the housing 20 enable a user to install and/or remove a voltage converting device without connecting and/or disconnecting any wires.

As described herein, the voltage converting system may be utilized in combination with a lighting fixture in some embodiments. In some of those embodiments the voltage converting system may be utilized in combination with a recessed lighting fixture. The voltage converting system may be accessible by pulling the trim of the recessed lighting fixture down and reaching into the lighting fixture opening. In certain implementations a user may remove the voltage converting device of the voltage converting system from the room side of the lighting fixture without utilizing any tools.

Thus, while several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for removably receiving a voltage converting device, comprising:
- a housing (20) having a recessed receptacle, said recessed receptacle including a rear wall (22) and sidewall structure (24) extending upwardly from said rear wall (22) and generally defining a receptacle opening;
- a first high voltage contact, a second high voltage contact, a first low voltage contact and a second low voltage contact all within said receptacle;
- a first high voltage lead fixedly electrically coupled to said first high voltage contact and extending from said housing (20), a second high voltage lead fixedly electrically coupled to said second high voltage contact and extending from said housing (20), a first low voltage lead fixedly electrically coupled to said first low voltage contact and extending from said housing (20), and a second low voltage lead fixedly electrically coupled to said second low voltage contact and extending from said housing (20);
- at least one positioning structure (30A, 32) within said receptacle, said at least one positioning structure (30A, 32) only enabling receipt of said voltage converting device within said receptacle in a predefined orientation range;
  - wherein said positioning structure (30A, 32) prevents contact between contacts of said voltage converting device and any of said first high voltage contact, said second high voltage contact, said first low voltage contact, and said second low voltage contact unless said voltage converting device is in said orientation range; and
  - wherein said apparatus enables removable receipt of said voltage converting device.

2. The apparatus of claim 1, wherein said at least one positioning structure (30A, 32) includes a first positioning protrusion extending outwardly from at least one of said rear wall (22) and said sidewall structure (24).

3. The apparatus of claim 2, wherein said at least one positioning structure (30A, 32) includes a second positioning protrusion extending outwardly from at least one of said rear wall (22) and said sidewall structure (24).

4. The apparatus of claim 1, wherein said receptacle opening is continuously open and obstruction free when said voltage converting device is received in said receptacle.

5. The apparatus of claim 1, wherein said sidewall structure (24) includes at least one recess area therein, said recess area having a recessed edge that is closer to said rear wall (22) than an immediately adjacent edge of said sidewall structure (24).

6. A voltage converting system for use in a luminaire, comprising:
- a voltage converting device having a first converter high voltage contact, a second converter high voltage contact, a first converter low voltage contact, a second converter low voltage contact, and at least one converter positioning structure (60A, 60B, 62);
- a housing (20) having a recessed receptacle, said recessed receptacle including a rear wall (22) and sidewall structure (24) extending upwardly from said rear wall (22) and generally defining a receptacle opening;

said housing (20) including a first housing high voltage contact, a second housing high voltage contact, a first housing low voltage contact, and a second housing low voltage contact all within said receptacle;

said housing (20) further including at least one housing positioning structure (30A, 32) within said receptacle, said at least one housing positioning structure (30A, 32) interfacing with said at least one converter positioning structure (60A, 60B, 62) only when said voltage converting device (50) is in a predefined orientation range with respect to said receptacle;

whereby said housing positioning structure (30A, 32) enables contact between said first converter high voltage contact, said second converter high voltage contact, said first converter low voltage contact, and said second converter low voltage contact and respective of said first housing high voltage contact, said second housing high voltage contact, said first housing low voltage contact, and said second housing low voltage contact only when said voltage converting device is in said predefined orientation range; and whereby said voltage converting device is removably received in said receptacle.

7. The apparatus of claim 6, wherein said at least one housing positioning structure (30A, 32) includes a first positioning protrusion extending outwardly from at least one of said rear wall (22) and said sidewall structure (24).

8. The apparatus of claim 7, wherein said at least one converter positioning structure (60A, 60B, 62) includes a first positioning recess.

9. The apparatus of claim 8, wherein said at least one housing positioning structure (30A, 32) includes a second positioning protrusion extending outwardly from at least one of said rear wall (22) and said sidewall structure (24).

10. The apparatus of claim 7, wherein at least two of said at least one housing positioning structure (30A, 32) are provided and at least two of said at least one converter positioning structure (60A, 60B, 62) are provided.

11. The apparatus of claim 6, wherein said voltage converting device (50) is in interference fit with said housing (20) when removably received therein.

12. The apparatus of claim 11, wherein said first converter high voltage contact, said second converter high voltage contact, said first converter low voltage contact, and said second converter low voltage contact are in interference fit with respective of said first housing high voltage contact, said second housing high voltage contact, said first housing low voltage contact, and said second housing low voltage contact when said voltage converting device is removably received in said receptacle.

13. The apparatus of claim 11, wherein said voltage converting device (50) is maintained in said receptacle through interference fit alone.

14. The apparatus of claim 6, wherein said sidewall structure (24) includes at least one recess area therein, said recess area providing access to a side of said voltage converting device (50) when said voltage converting device (50) is removably received in said receptacle.

15. The apparatus of claim 6, wherein said voltage converting device (50) is an LED driver.

16. The apparatus of claim 6, wherein said receptacle opening is continuously open and obstruction free when said voltage converting device (50) is received in said receptacle.

* * * * *